Jan. 6, 1925.
P. S. WARD
OILING MEANS
Filed Oct. 23, 1922
1,522,090
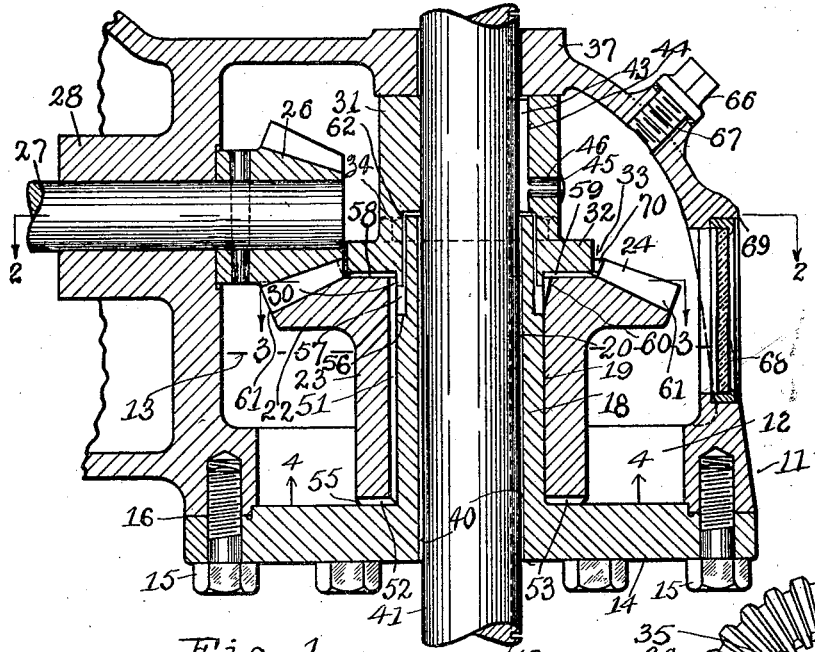
Fig. 1.
Fig. 3.
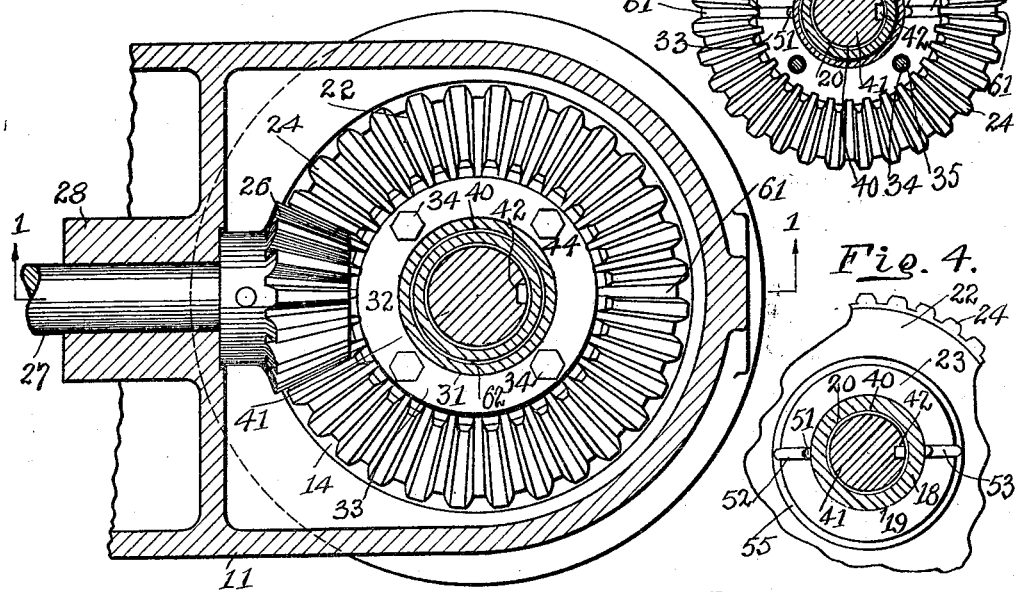
Fig. 2.
Fig. 4.
Inventor:
Paul S. Ward,
by his Attorney.

Patented Jan. 6, 1925.

1,522,090

UNITED STATES PATENT OFFICE.

PAUL S. WARD, OF CINCINNATI, OHIO, ASSIGNOR TO THE TRIUMPH MANUFACTURING COMPANY, OF CINCINNATI, OHIO, A CORPORATION OF OHIO.

OILING MEANS.

Application filed October 23, 1922. Serial No. 596,299.

*To all whom it may concern:*

Be it known that I, PAUL S. WARD, a citizen of the United States, residing at Cincinnati, in the county of Hamilton and State of Ohio, have invented certain new and useful Improvements in Oiling Means, of which the following is a specification.

My invention relates to oiling means for oiling power transmitting mechanism, and it is the object of my invention to provide novel oiling means whereby compactly arranged operating mechanism may be freely oiled, and especially such mechanism which comprises an axially movable shaft; and, further, to provide novel mechanism whereby the axially movable shaft shall be maintained free from the flow of oil, and whereby, further, the escape of oil is avoided.

I have exemplified my invention as employed in connection with an upright axially slidable shaft having spline-groove and key connection with a rotatable power transmitting member, such upright shaft being employable for instance for rotating the beater-shaft, to the lower end of which a suitable whip or beater is arranged to be secured, for operation in a so-called cake mixing machine in the baking art. It is desirable that this upright shaft be maintained free from the flow of oil and that the dripping of oil below the housing from which the shaft projects toward the batch-receiving bowl, be avoided, on account of danger of having the oil received in the batch. The term oil in this description and the appended claims includes any other lubricant.

The invention will be further readily understood from the following description and claims, and from the drawing, in which latter:

Fig. 1 is a vertical axial section of my improved device, taken in the plane of the line 1—1 of Fig. 2.

Fig. 2 is a horizontal cross-section of the same, taken in the plane of the line 2—2 of Fig. 1.

Fig. 3 is a horizontal cross-section of a detail of the same, taken in the plane of the line 3—3 of Fig. 1; and, Fig. 4 is a horizontal section of a detail of the same, taken in the plane of the line 4—4 of Fig. 1.

A housing 11, which forms a casing for the mechanism, has an oil-reservoir 12 therein, the desirable level of oil in the oil-reservoir being indicated by the dotted line 13. In the form shown the casing has a removable bottom 14, secured to the body of the casing by means of bolts 15, for forming an oil-tight joint 16 therewith.

A stud 18 extends upwardly from the bottom and has a journal 19 about its outer periphery and a bore 20, the journal and bore being shown concentric. The stud extends upwardly in the oil-reservoir and preferably extends above the level of oil in the reservoir.

A power transmitting member 22, shown as a bevel-gear, is journaled about the stud, the lower end of the hub 23 of the bevel-gear being located in the oil-reservoir.

A bevel-pinion 26 is shown meshing with the bevel-gear and is fastened to a shaft 27 journaled in a bearing 28 in the casing.

A bearing 31 is fixed to the rotary power transmitting member 22, as by providing the bearing with a flange 32 received within the recess 33 within the circle of the inner ends of the teeth of the bevel-gear, and with an annular rib 30 received within the bore of the member 22, bolts 34 received in holes in the flange and threaded into threaded holes 35 in the bevel-gear clamping the bearing to the bevel-gear.

The casing is provided with a bearing 37 above the bearing 31. The power transmitting member 22 is journaled about the upright stud 18, and said power transmitting member and said stud have rotative journal fit between the bottom wall of the casing and the bearing 37, for compact positioning and operation of the parts.

A shaft 41 is preferably spaced by an annular space 40 from the wall of the bore 20 of the stud 18, and has a sliding journal connection in the bearing 31. The space 40 is sufficiently wide to prevent oil passing therealong by capillary attraction. The shaft is shown as provided with a spline-groove 42, a key 43 being received in this spline-groove and a companion groove 44 in the bearing 31, a pin 45 extending from the key being received in a hole 46 in the bearing 31 for positioning the key.

An oil-channel 51 extends up and down between the power transmitting member 22 and its journal 19, being shown in the wall of the bearing-bore of the bevel-gear. The lower end of this oil-passage connects with the oil-reservoir, for instance by means of a cross oil-channel 52, shown as a groove in the lower end of the bevel-gear. An additional cross oil-groove 53 is shown in the lower end of the bevel-gear 22 to aid in the oiling of the journal 19. The lower end of the bevel-gear is provided with a peripheral chamber 55 to aid in directing the oil into the oil-channels.

An annular outer rabbet 56 is formed in the upper end of the stud 18, to form an annular oil-channel 57, between the stud and the bearing 31. The upper end of the oil-channel 51 connects with this annular-oil-channel. A cross oil-channel 58, shown formed in the upper end of the bevel-gear 22, connects with the oil-channel 51 and with the annular oil-channel 57. A cross oil-channel 59 connects at its inner end with the annular oil-channel, as by means of an oil-passage 60. The outer ends of the cross oil-channels 58, 59, connect with tooth-spaces 61 between the teeth of the bevel-gear 22, and thereby lubricate said teeth as well as the teeth of the bevel-pinion 26, sufficient oil passing along the bevel-pinion 26 to lubricate the bearing 28 and shaft 27.

There is an annular space 62 between the upper end of the stud 18 and the lower end of the bearing part 31 sufficiently wide to prevent oil passing therealong by capillary attraction, so as to prevent oil entering the space 40 in sufficient quantity to cause dripping, or the passage of oil along the shaft 41.

A suitable plug 66 is provided for closing an opening 67 through which oil may be supplied to the oil-reservoir. The casing is shown provided with a viewing lens 68, in an opening 69 in the casing, which is preferably placed at substantially the level of the tooth-spaces of the bevel-gear 22, so as to readily maintain the desired level of the oil in the oil-reservoir and insure that the lower end of said bevel-gear shall continuously run in oil.

In operation, the oil having been supplied to proper level in the oil-reservoir, will, during rotation of the operating parts, be drawn by gravity into the cross oil-channels 52, 53, and the oil-channel 51 which extends up and down, and will rise in said last-named oil-channel by capillary attraction and thereby reach the annular oil-channel 57 and the cross oil-channel 58. The centrifugal action of the rotating parts on the oil aids in such travel of the oil. Rotation of the rotary power transmitting member causes the oil to be urged outwardly by centrifugal force and to pass through the passages 58, 59, outwardly, the parts acting as a centrifugal pump for the oil, to cause constant and free lubrication of the journal for the bevel-gear 22, and the parts outward thereof, but drawing the oil away from the shaft 41.

The centrifugal action on the oil compels any surplus oil to be urged outwardly along the tooth-spaces of the bevel-gear 22, and any excess of oil which may have been received in the annular groove 70 between the flange 32 and the inner ends of the bevel-teeth 24 will also be moved outwardly along said tooth-spaces. The oil which is thus moved outwardly by centrifugal force returns to the reservoir, whereby a constant circulation of oil is maintained. Sufficient oil reaches all parts for efficient and economical lubrication, but the oil is drawn away from the upright shaft, so as to prevent oil from descending along the shaft or along the spline-groove below the housing and prevent deleterious dripping or flow of oil.

Having thus fully described my invention, what I claim as new, and desire to secure by Letters Patent, is:

1. In oiling means, the combination of an upright stud having a journal on its outer periphery and a central bore, said journal and the inner face of the wall of said bore being concentric, a rotary power transmitting member journaled on said journal, an axially slidable shaft in said bore, a bearing for said shaft fixed to said rotary power transmitting member and located above said stud, an oil-reservoir at the bottom of said rotary power transmitting member, an oil-channel extending up and down between said rotary power transmitting member and said journal, the lower end of said oil-channel connecting with said oil-reservoir, and a cross oil-channel between said rotary power transmitting member and said bearing connecting at its inner end with the upper end of said first-named oil-channel and discharging into said oil-reservoir at its outer end.

2. In oiling means, the combination of an upright stud having a journal on its outer periphery and a central bore, said journal and the inner wall of said central bore being concentric, a rotary power transmitting member journaled on said journal, a bearing fixed to said rotary power transmitting member and located above said stud, a power transmitting shaft in said bore and in said bearing, said power transmitting shaft spaced from the wall of said bore, power connecting means between said bearing and said shaft causing rotative connection between said bearing and said shaft and permitting relative movement in axial direction between the same, an oil-reservoir at the bottom of said rotary power transmitting member, an oil-channel extending up and down between said rotary power transmitting member and said journal, the lower end of said oil-channel connecting with said oil-reservoir, and a cross oil-channel at the upper portion of said rotary power transmitting member connecting at its inner end with the upper end of said first-named oil-channel and discharging into said oil-reservoir at its outer end.

3. In oiling means, the combination of an upright stud having a journal on its outer periphery and a central bore, a bevel-gear journaled about said stud, a bearing above said stud, means for rigidly securing said bearing to said bevel-gear, a shaft slidable axially in said stud and in said bearing and having rotative connection with said bearing, an oil-reservoir, the lower ends of said stud and said bevel-gear located in said oil-reservoir, an oil-channel extending up and down between said bevel-gear and said stud, the lower end of said oil-channel connecting with said oil-reservoir, and a cross oil-channel between the upper end of said first-named oil-channel and a tooth-space of said bevel-gear for discharging oil back into said reservoir by centrifugal force imparted to the oil by rotation of said bevel-gear.

4. In oiling means, the combination of a chamber, an oil-reservoir at the bottom of said chamber, a stud extending upwardly from the bottom of said chamber, said stud having a journal on its outer periphery and a central bore, a bevel-gear journaled on said journal, a bearing above said stud fixed to said bevel-gear, an axially slidable shaft in said bore and in said bearing, said shaft having rotative connection with said bearing, an annular oil-channel about the upper end of said stud, an oil-channel extending up and down between said bevel-gear and said stud, a cross oil-channel connecting with the lower part of said last-named oil-channel and with the lower part of said oil-reservoir, a cross oil-channel connecting with said annular oil-channel and the tooth-spaces of said bevel-gear, and a viewing lens in the wall of said casing at substantially the level of said tooth-spaces.

In testimony whereof, I have hereunto signed my name in the presence of two subscribing witnesses.

PAUL S. WARD.

Witnesses:
PAUL V. CONNOLLY,
DELMA WERNSING.